Oct. 16, 1962    J. R. JOHNSON    3,058,718
VALVE AND SEALING MEANS THEREFOR
Filed July 23, 1958                2 Sheets-Sheet 2

INVENTOR.
JESSE R. JOHNSON
BY Shanley & O'Neil
ATTORNEYS

United States Patent Office 3,058,718
Patented Oct. 16, 1962

3,058,718
VALVE AND SEALING MEANS THEREFOR
Jesse R. Johnson, Gowanda, N.Y., assignor to Knowles-Fisher Corporation, a corporation of New York
Filed July 23, 1958, Ser. No. 750,484
4 Claims. (Cl. 251—214)

This invention relates to valves, and more particularly to valves for controlling the flow of fluid under pressure, in which a valve member is movable within a valve casing by means of a valve stem and sealing means are provided to prevent the leakage of fluid between the casing and the stem.

It is an object of the present invention to provide valves of the foregoing type which will be sealed against the leakage of fluids over a broad range of operating pressures.

Another object of the present invention is the provision of valves of the foregoing type in which the sealing effect of the sealing means is enhanced by the pressure of the fluid.

Still another object of the present invention is the provision of valves of the foregoing type in which the sealing means also serves accurately to position the valve member.

A further object of the present invention is the provision of valves of the foregoing type which not only will seal firmly at low pressures but also will operate easily at high pressures.

A still further object of the present invention is the provision of valves of the foregoing type in which the stem sealing surfaces are protected from damaging contact with the valve member.

Finally, it is an object of the present invention to provide valves of the foregoing type which will be simple and inexpensive to manufacture, easy to assemble and operate, and rugged and durable in use.

Other objects and advantages of the present invention will become apparent from a consideration of the following description, taken in connection with the accompanying drawings, in which:

FIGURE 4 is a view similar to FIGURE 1 but showing another embodiment of valve assembly according to the present invention.

Figure 1:
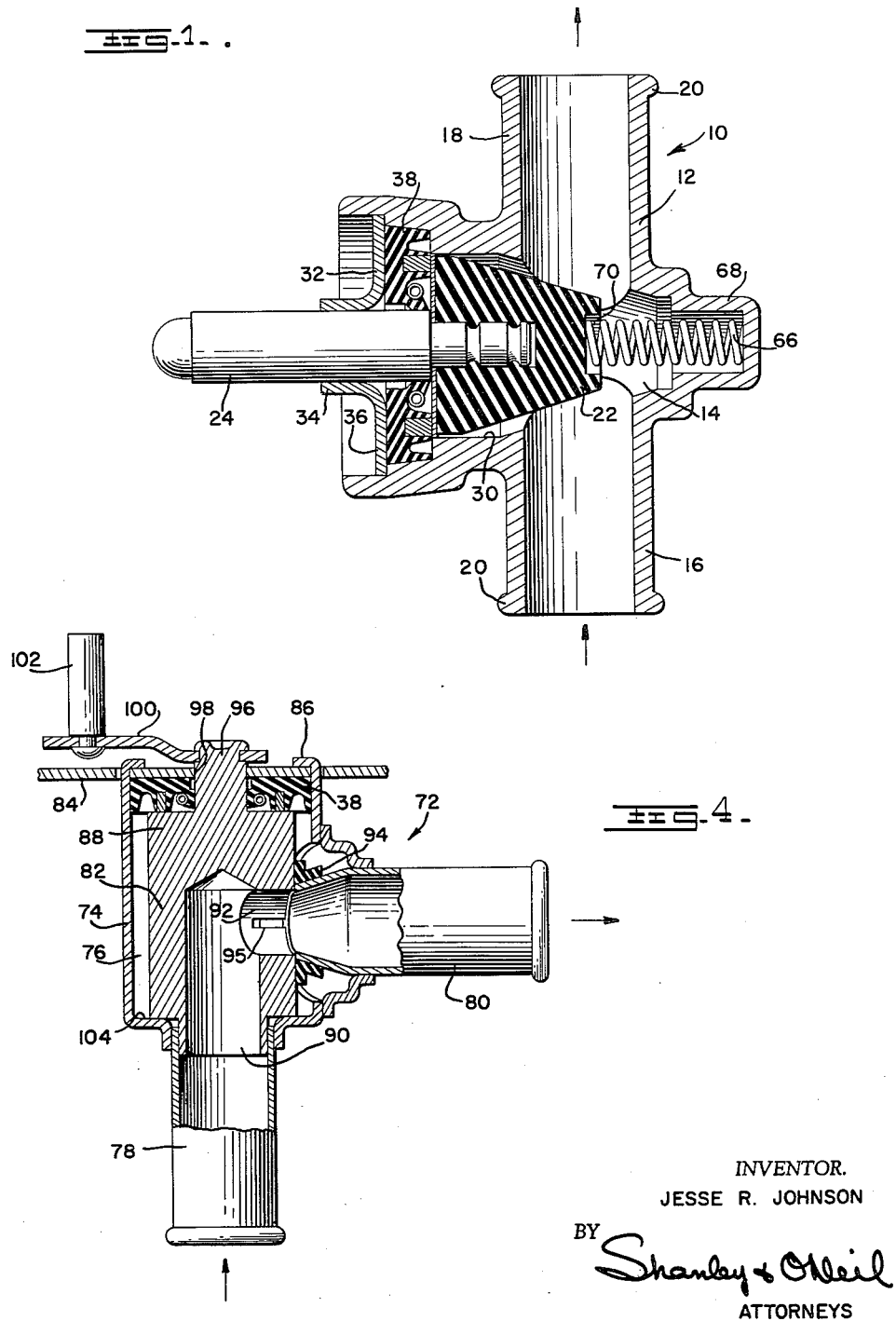
FIGURE 1 is a sectional view showing one embodiment of a valve assembly constructed in accordance with the present invention and showing the valve member in its open position.

Referring now to the drawings in greater detail, there is shown in FIGURE 1 a valve assembly indicated generally at 10, comprising a valve casing 12 having a valve chamber 14 therein. Fluid enters the valve by fluid inlet 16 and leaves the valve by fluid outlet 18, the inlet and outlet being interconnected by a fluid passageway including a portion of chamber 14. Inlet 16 and outlet 18 are provided with enlarged portions 20 for connection with hoses, pipes or other forms of conduits.

Mounted for reciprocatory movement in casing 12 between open and closed valve positions is a valve member 22 having secured thereto a cylindrical valve stem 24 which extends outside casing 12 for moving member 22 between open and closed valve positions. Member 22 comprises a body portion 26 of generally truncated conical configuration and is of rubber or other elastic deformable material. Body portion 26 is backed up by an annular brass washer 28 which has free sliding fit within cylindrical bore portion 30 of chamber 14. A portion of casing 12 is comprised by an annular cap 32 enclosing valve stem 24 and having an axially extending annular flange 34 which extends outward along valve stem 24 away from valve member 22 and a flange 36 which is disposed in a plane perpendicular to the axis of valve stem 24 and is secured to the remainder of casing 12 as by a detachable snap ring (not shown). Thus, flange 34 provides a bearing and guideway for axial sliding movement of valve stem 24 and with it valve member 22.

A very important part of the present invention comprises the provision of sealing means comprising an annular sealing ring 38 which is principally rubber or other elastic deformable material. Ring 38 is disposed entirely about valve stem 24 and has an internal diameter substantially greater than the external diameter of stem 24. Ring 38 is disposed within casing 12 flat against and entirely about flange 36. Thus, a first resilient portion 40 of ring 38 is disposed in sealing engagement with the interior of the casing entirely about the valve stem. Moreover, portion 40 has not only a surface 42 in fluid sealing engagement with that portion of casing 12 comprising flange 36 but also an exposed surface 44. As indicated above, valve member 22 has loose sliding support in cylindrical bore portion 30 of chamber 14, and this loose connection permits a limited flow of fluid between casing 12 and valve member 22 in at least the open position of the valve. Thus, exposed surface 44 is in fluid communication with the passageway between inlet 16 and outlet 18 in all valve positions except the closed position. Of course, in the closed valve position, body portion 26 of valve member 22 seats firmly in fluid sealing engagement with and between the inlet and outlet conduits.

Ring 38 has a second resilient portion 46 having a surface 48 in fluid sealing engagement with the exterior of valve stem 24. As in the case of first resilient portion 40, second resilient portion 46 has an exposed surface 50 which is in fluid communication with the passageway between inlet 16 and outlet 18 in all valve positions except the closed valve position. Surface 48 is borne by an annular flange 52 which comprises a part of second resilient portion 46 and extends radially inward to and against valve stem 24. At its end nearest valve member 22, flange 52 has a truncated conical surface 54 forming a portion of exposed surface 50. Surface 54 encompasses valve stem 24 and terminates inward at the outer surface of the valve stem and extends outward away from the valve member at an acute angle to the outer surface of valve stem 24. Second resilient portion 46 has an annular, outwardly opening groove 56 recessed therein for the reception and retention of a continuous elastic deformable member in tension, in the form of a steel garter spring 58, to enhance the sealing effect of second resilient portion 46. Spring 58 is under sufficient tension to bring surface 48 into fluid sealing engagement with valve stem 24 even when there is no fluid pressure. In this connection, a metallic coil tension spring is preferable to a rubber ring or the like since the metallic spring enables accurate adjustment of the sealing pressure on surface 48 and does not tend to bind to any portion of ring 38.

Ring 38 also has a medial annular rib 60 extending axially thereof on the same side as flange 52 and disposed outwardly of flange 52. Rib 60 has tapering converging opposite sides between which is disposed an annular recess 62. Secured in recess 62 is an annular insert ring 64 of rectangular cross-sectional configuration with its greatest cross-sectional dimension extending axially of ring 38. The cross-sectional configuration of ring 64 is complementary to that of recess 62 so that ring 64 fits snugly in recess 62. Thus, ring 64 is in any event held frictionally in recess 62 and it is not necessary otherwise to secure ring 64 in recess 62. The surface of ring 64 adjacent valve member 22 is flush with the upper ends of recess 62 and rib 60 as seen in FIGURE 3. Thus, ring 64 and rib 60 terminate in a common plane perpendicular to the axis of ring 38 and valve stem 24, and this plane is spaced more closely adjacent valve member 22 than any portion of flange 52, so that washer 28 is held out of contact with flange 52 by ring 64 in the open valve position shown in FIGURES 1 and 2. Even in that position, ring 64 and washer 28 do not have fluid sealing contact so that there is limited fluid communication between exposed surfaces 50 and 54 on the one hand and the fluid passageway between inlet 16 and outlet 18 on the other hand in any valve position except the closed position.

Rib 60 yieldably connects ring 64 to the remainder of sealing ring 38 for limited movement of ring 64 relative to the remainder of ring 38.

Figure 2:
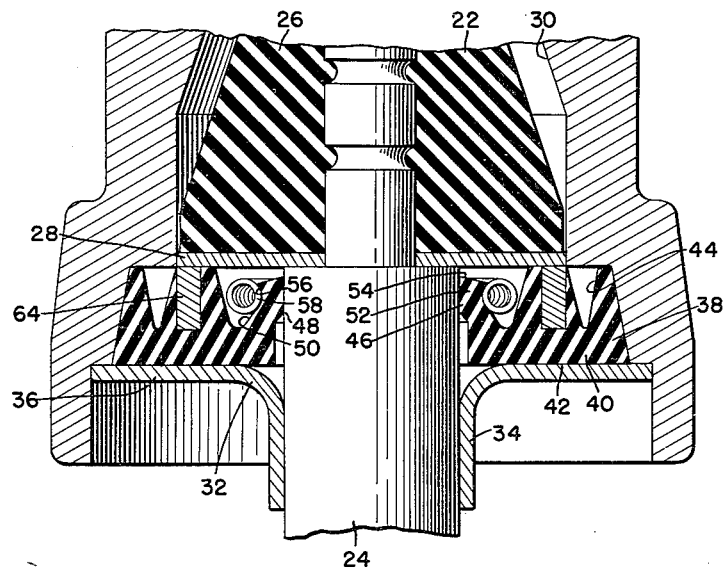
FIGURE 2 is an enlarged fragmentary view of a portion of FIGURE 1.
Figure 3:
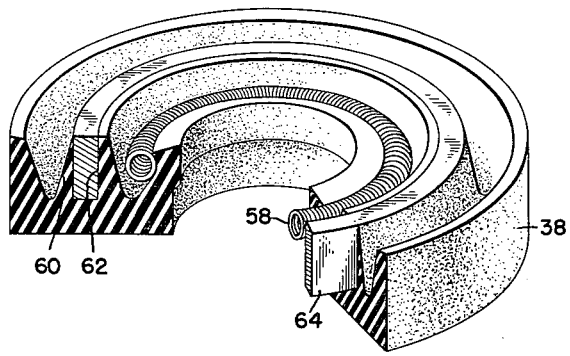
FIGURE 3 is an enlarged perspective view, partially broken away, of the sealing means of the present invention.

Valve member 22 is continuously urged toward the open position shown in FIGURES 1 and 2 by means of a coil compression spring 66 which is coaxial with valve member 22 and valve stem 24. The end of spring 66 remote from valve member 22 is disposed in a hollow projection 68 formed integrally with casing 12, while the other end of spring 66 is disposed in a shallow cylindrical recess 70 in the adjacent end of valve member 22. Thus, pressure on the outer end of valve stem 24 moves valve member 22 against the action of spring 66 to the right as seen in FIGURE 1 to its closed position in which body portion 26 of valve member 22 closes both the inlet and the outlet sides of the fluid passageway between inlet 16 and outlet 18, while the release of pressure on valve stem 24 permits valve member 22 to move rapidly to the left as seen in FIGURE 1 under the action of spring 66 until washer 28 contacts ring 64. In this latter position, rib 60 and spring 66 coact yieldably to urge ring 64 and washer 28 into contact with each other.

In FIGURE 4 is shown another embodiment of the present invention, comprising a rotary plug valve assembly 72 including a generally cylindrical valve casing 74 having a valve chamber 76 therein which is provided with a fluid inlet 78 and a lateral outlet 80 interconnected by a fluid passageway. Valve chamber 76 has a valve member 82 comprising a tubular plug rotatably mounted therein and is closed at its upper end by plate 84. Casing 74 is secured to plate 84 by providing a plurality of tongues 86 which are inserted through suitably arranged holes in plate 84 and clinched.

Valve member 82 has a closed end 88 and an oppositely disposed open end 90, the latter defining the inlet port of the valve member. Intermediate ends 88 and 90 is disposed an opening 92 adapted for registry with outlet 80 upon rotation of valve member 82 so as to provide an outlet port for valve member 82. An annular elastic deformable seal 94 surrounds the inner end of outlet 80 within casing 74 and has fluid sealing contact with and entirely about the inner end of outlet 80 and with and entirely about the marginal edges of opening 92 in the open valve position shown in FIGURE 4 except for the passageway provided by chordal slot 95 between the annular interior of casing 74 outside valve member 82 and the interior of the valve.

Closed end 88 of valve member 82 has a cylindrical valve operating stem 96 formed integrally thereon which extends upwardly through circular opening 98 in plate 84. A valve operating lever 100 is suitably secured to the outer end of stem 96 and is provided with a pin 102 on its free end for connection with a valve operator. Adjacent open end 90 of valve member 82, casing 74 is provided with a lower annular internal shoulder 104 in and upon which open end 90 rotates. Thus, shoulder 104 provides a loose bearing area for open end 90, there being non-sealing clearance between these two members so that the passageway interconnecting inlet 78 and outlet 80 and the annular interior of casing 74 outside valve member 82 are in fluid communication with each other in all valve positions. It will also be appreciated that when opening 92 is substantially out of registry with outlet 80 it will instead open into the annular space between valve member 82 and casing 74 thereby to provide an additional path of communication between that passageway and that annular space, and that two further such passageways are provided by slot 95 on either side of opening 92 in the open valve position.

Sealing means are provided for the valve shown in FIGURE 4 which are identical with those shown for the valve of FIGURE 1. Thus, in the embodiment of FIGURE 4, sealing ring 38 has the same structure and function as shown for example in FIGURE 2, except that closed end 88 in FIGURE 4 rotates about its axis and has no rectilinear movement, while remaining at all times in contact with the rigid insert ring portion of sealing ring 38; whereas in the embodiment of FIGURES 1 and 2 the washer 28 does not necessarily have any rotary component of motion but reciprocates axially of the valve member and is only intermittently in contact with the rigid insert ring 64 of that embodiment. Hence, in the embodiment of FIGURE 4, shoulder 104 and the medial rib of ring 38 coact yieldably to urge closed end 88 of valve member 82 and the rigid insert ring portion of sealing ring 38 into contact with each other in all valve positions.

From a consideration of the above, it will be obvious that all of the initially recited objects of the present invention have been achieved.

Although the present invention has been described in connection with preferred embodiments, it is to be understood that modifications and variations may be resorted to without departing from the spirit of the invention, as those skilled in this art will readily understand. Such modifications and variations are considered to be within the scope of the invention as defined by the appended claims.

What is claimed is:

1. In a valve for controlling the flow of fluid, comprising a valve casing having inlet and outlet openings interconnected by a fluid passageway, a valve member mounted in the casing for movement between an open position in which fluid may flow through the passageway and a closed position in which the valve member closes the passageway, and a valve stem secured to the valve member and extending outside the casing for moving the valve member between said open and closed positions; the improvement comprising sealing means surrounding the valve stem inside the valve casing and having (A) a base
  (1) in fluid sealing contact with the interior of the casing entirely about the valve stem
  (2) spaced from the valve stem
  (3) spaced from the valve member in all positions of the valve member
(B) a resilient portion
  (1) extending from the base toward the valve member
  (2) having fluid sealing engagement with an entirely about the valve stem
(C) a rigid spacer portion
  (1) extending from the base toward the valve member
  (2) having contact with the valve member about and a substantial distance from the valve stem in at least the open valve position
  (3) spaced radially outward from (B)
(D) and means
  (1) spaced radially inward from (C)
  (2) yieldably urging (B) into circumferential sealing contact with the valve stem whereby the relationships (A)(2), (B)(1) and (C)(3)

assure that (B) seals about the valve stem with a predeterminable contact pressure which is substantially independent of the contact pressures between (A) and the casing and between (C) and the valve member.

2. Structure as claimed in claim 1, in which (C) is closer to the valve member than is (B).

3. Structure as claimed in claim 1, in which (C) is a rigid member encircling the valve stem.

4. Structure as claimed in claim 1, in which (A) is an annulus of elastic deformable material.

References Cited in the file of this patent

UNITED STATES PATENTS

| | | |
|---|---|---|
| 1,000,799 | Grimes | Aug. 15, 1911 |
| 2,430,836 | Taylor | Nov. 11, 1947 |
| 2,451,269 | Allen | Oct. 12, 1948 |
| 2,818,287 | Josephson | Dec. 31, 1957 |

FOREIGN PATENTS

| | | |
|---|---|---|
| 617,957 | Great Britain | of 1949 |
| 648,678 | Great Britain | of 1951 |
| 470,043 | Italy | of 1952 |
| 523,684 | Italy | Apr. 18, 1955 |
| 530,270 | Italy | of 1955 |
| 190,354 | Austria | June 25, 1957 |